US012478937B2

(12) United States Patent
Lupo

(10) Patent No.: US 12,478,937 B2
(45) Date of Patent: Nov. 25, 2025

(54) PORTABLE WARMING BLENDER

(71) Applicant: Leah Lupo, Merrick, NY (US)

(72) Inventor: Leah Lupo, Merrick, NY (US)

( * ) Notice: Subject to any disclaimer, the term of this patent is extended or adjusted under 35 U.S.C. 154(b) by 0 days.

(21) Appl. No.: 17/647,398

(22) Filed: Jan. 7, 2022

(65) Prior Publication Data

US 2022/0250020 A1 Aug. 11, 2022

Related U.S. Application Data

(60) Provisional application No. 63/200,050, filed on Feb. 11, 2021.

(51) Int. Cl.
*B01F 35/93* (2022.01)
*A61J 9/00* (2006.01)
(Continued)

(52) U.S. Cl.
CPC ............. *B01F 35/93* (2022.01); *A61J 9/00* (2013.01); *B01F 27/808* (2022.01); *B01F 33/5014* (2022.01); *B01F 35/2115* (2022.01); *B01F 35/2205* (2022.01); *B01F 35/2215* (2022.01); *B01F 35/222* (2022.01);
(Continued)

(58) Field of Classification Search
CPC .... B01F 35/93; B01F 33/453; B01F 33/4532; B01F 33/4533; B01F 33/4535; B01F 33/4537; B01F 27/071; B01F 27/073; B01F 33/4534; B01F 35/41; B01F 35/4112; B01F 33/452; A61J 9/00; A61J 9/008; A47J 43/0465
See application file for complete search history.

(56) References Cited

U.S. PATENT DOCUMENTS 2,180,633 A * 11/1939 Holt .................. F16B 23/0061
411/405
2,655,354 A * 10/1953 Murray ................ B01F 33/453
310/78
(Continued)

FOREIGN PATENT DOCUMENTS

CN 210902467 U * 7/2020
CN 212165565 U * 12/2020

*Primary Examiner* — Claire X Wang
*Assistant Examiner* — Patrick M Mccarty
(74) *Attorney, Agent, or Firm* — Carter, DeLuca & Farrell LLP; John R. Sepulveda

(57) ABSTRACT

A portable warming blender includes a base assembly with a recessed portion; a temperature control system; a detachable agitator rotatably mounted on an axle extending longitudinally into the recessed portion; an electric motor; a rechargeable power system; and a controller. The base assembly includes a housing with a cylindrical sidewall, housing the motor, the power system, and the controller. An inner surface of the recessed portion is threaded. The temperature control system includes a temperature sensor and a heating element. The temperature sensor is mounted adjacent to the axle. The heating element heats the recessed portion. The motor is magnetically coupled with the agitator. The rechargeable power system includes a rechargeable battery and a charging port. The controller selectively transmits power to the temperature control system and the motor from the power system when an operating mode is selected. The blender warms, blends, or both in one device anywhere, anytime.

12 Claims, 4 Drawing Sheets

(51) Int. Cl.
    *B01F 27/808*     (2022.01)
    *B01F 33/501*     (2022.01)
    *B01F 35/21*     (2022.01)
    *B01F 35/22*     (2022.01)
    *B01F 35/221*     (2022.01)
    *B01F 35/222*     (2022.01)
    *B01F 35/32*     (2022.01)
    *B01F 35/90*     (2022.01)
    *B01F 101/14*     (2022.01)

(52) U.S. Cl.
    CPC .... *B01F 35/32025* (2022.01); *B01F 35/3204* (2022.01); *B01F 35/3213* (2022.01); *B01F 2035/99* (2022.01); *B01F 2101/14* (2022.01)

(56) References Cited

U.S. PATENT DOCUMENTS

| | | | |
|---|---|---|---|
| 3,570,819 A * | 3/1971 | Rosinger | B01F 33/452 366/302 |
| 4,889,248 A * | 12/1989 | Bennett | A47J 43/046 215/390 |
| 5,240,322 A * | 8/1993 | Haber | B01F 33/4533 604/416 |
| 5,968,396 A | 10/1999 | Rodriguez | |
| 6,206,562 B1 * | 3/2001 | Eyraud | B01F 33/453 366/273 |
| 6,639,186 B1 | 10/2003 | Perez | |
| 7,878,701 B2 | 2/2011 | Stephens et al. | |
| 7,942,145 B2 | 5/2011 | Palena et al. | |
| 8,152,083 B2 | 4/2012 | Bower et al. | |
| 8,851,739 B2 | 10/2014 | Gonzalez | |
| 9,364,806 B2 | 6/2016 | King | |
| 9,617,771 B2 * | 4/2017 | Gill | E05D 5/04 |
| 9,782,036 B2 | 10/2017 | Alexander | |
| 10,220,361 B1 * | 3/2019 | Dushine | B01F 21/10 |
| 10,391,461 B2 | 8/2019 | Alfoudari | |
| 10,702,837 B1 | 7/2020 | Pamplin | |
| 10,729,620 B2 | 8/2020 | Goodin | |
| 10,828,612 B1 * | 11/2020 | Pamplin | B01F 33/5011 |
| 2001/0035953 A1 * | 11/2001 | Morita | G01N 21/958 356/239.2 |
| 2005/0068846 A1 * | 3/2005 | Wulf | A47J 43/085 366/199 |
| 2007/0070805 A1 * | 3/2007 | Myhrberg | B01F 27/808 366/302 |
| 2007/0223895 A1 | 9/2007 | Flemm | |
| 2008/0298169 A1 * | 12/2008 | Branson, III | A47J 43/0716 366/205 |
| 2010/0157725 A1 * | 6/2010 | Terentiev | B01F 35/513 366/331 |
| 2014/0069606 A1 * | 3/2014 | Lee | B01F 33/452 165/63 |
| 2015/0283037 A1 | 10/2015 | Trejo | |
| 2016/0354740 A1 * | 12/2016 | Gonzalez | B01F 21/10 |
| 2017/0094721 A1 | 3/2017 | Moore et al. | |
| 2017/0144115 A1 * | 5/2017 | Roche Rebollo | B01F 27/808 |
| 2017/0274127 A1 | 9/2017 | Mitchell et al. | |
| 2018/0140128 A1 * | 5/2018 | Kodama | A47J 43/0465 |
| 2018/0333007 A1 * | 11/2018 | Ganahl | A47J 31/005 |
| 2019/0021548 A1 | 1/2019 | Eisner | |
| 2019/0174961 A1 * | 6/2019 | Zhu | A47J 43/0722 |
| 2019/0176110 A1 * | 6/2019 | Alfoudari | B01F 35/187 |
| 2020/0054172 A1 * | 2/2020 | Trakselis | A47J 43/0465 |
| 2020/0337494 A1 | 10/2020 | Tsui | |
| 2021/0032086 A1 * | 2/2021 | Zohar | B01F 27/811 |
| 2023/0106503 A1 * | 4/2023 | Schoefs | B01F 27/1132 366/65 |

* cited by examiner

PORTABLE WARMING BLENDER

CROSS-REFERENCE TO RELATED APPLICATION

This application claims the benefit of priority of U.S. provisional application No. 63/200,050, filed Feb. 11, 2021, the contents of which are herein incorporated by reference.

BACKGROUND OF THE INVENTION

The present invention relates to preparation of baby formula and, more particularly, to a portable warming blender.

As dual-income households rise, so do shared childcare responsibilities among parents. More parents are using formula to feed their babies, though improper bottle preparation can lead to gas, reflux, sleep issues and more for babies. Parents are also without a solution for bottle preparation on-the-go, making it difficult and inconvenient to feed baby while outside of the home, as well as in the home. Parents (especially with infants) are taking on more responsibility and lack a convenient, portable, quick solution to prepare bottles anywhere and anytime.

Commercially available devices that blend a liquid generally do not heat the liquid. Commercially available devices that warm a liquid generally do not blend the liquid. Both are incomplete solutions for proper bottle making. There are inventions on the market that are portable or rechargeable, though they ONLY blend or ONLY warm. Similar inventions that blend AND warm exist, but they are not portable or rechargeable and do not fit into convenient spaces for travel (e.g., car cup holder). Devices that blend and warm a liquid but are not portable/rechargeable can only be used in one location as they require an electrical outlet to use. They generally do not have an easily accessible storage component in which to keep formula powder.

Manual bottle making leaves the possibility for human error. Shaking or improper mixing often leads to gas, reflux, fussiness, and sleep issues and more (for baby and then for parents). On-the-go bottle making requires diligent preparation for parents—requiring them to bring an abundance of items. The preparation is unreliable without a warming device available at any given location.

As can be seen, there is a need for a portable device that blends and warms a liquid.

SUMMARY OF THE INVENTION

In one aspect of the present invention, a portable warming blender, comprising: a base assembly including a housing with a cylindrical sidewall and a recessed portion, wherein an inner surface of the recessed portion is threaded; an axle extending longitudinally into the recessed portion; a temperature control system including a temperature sensor and a heating element, said temperature sensor being mounted adjacent to said axle and said heating element being in thermal communication with the recessed portion of the housing; a detachable agitator rotatably mounted on the axle; an electric motor mounted within the housing, said electric motor being magnetically coupled with the detachable agitator; a rechargeable power system mounted within the housing, comprising a rechargeable battery electrically communicating with a charging port within the cylindrical sidewall; and a controller operative to selectively transmit power to the temperature control system and the electric motor from the rechargeable power system upon receipt of an operating mode selection.

These and other features, aspects and advantages of the present invention will become better understood with reference to the following drawings, description, and claims.

DETAILED DESCRIPTION OF THE INVENTION

Figure 1:
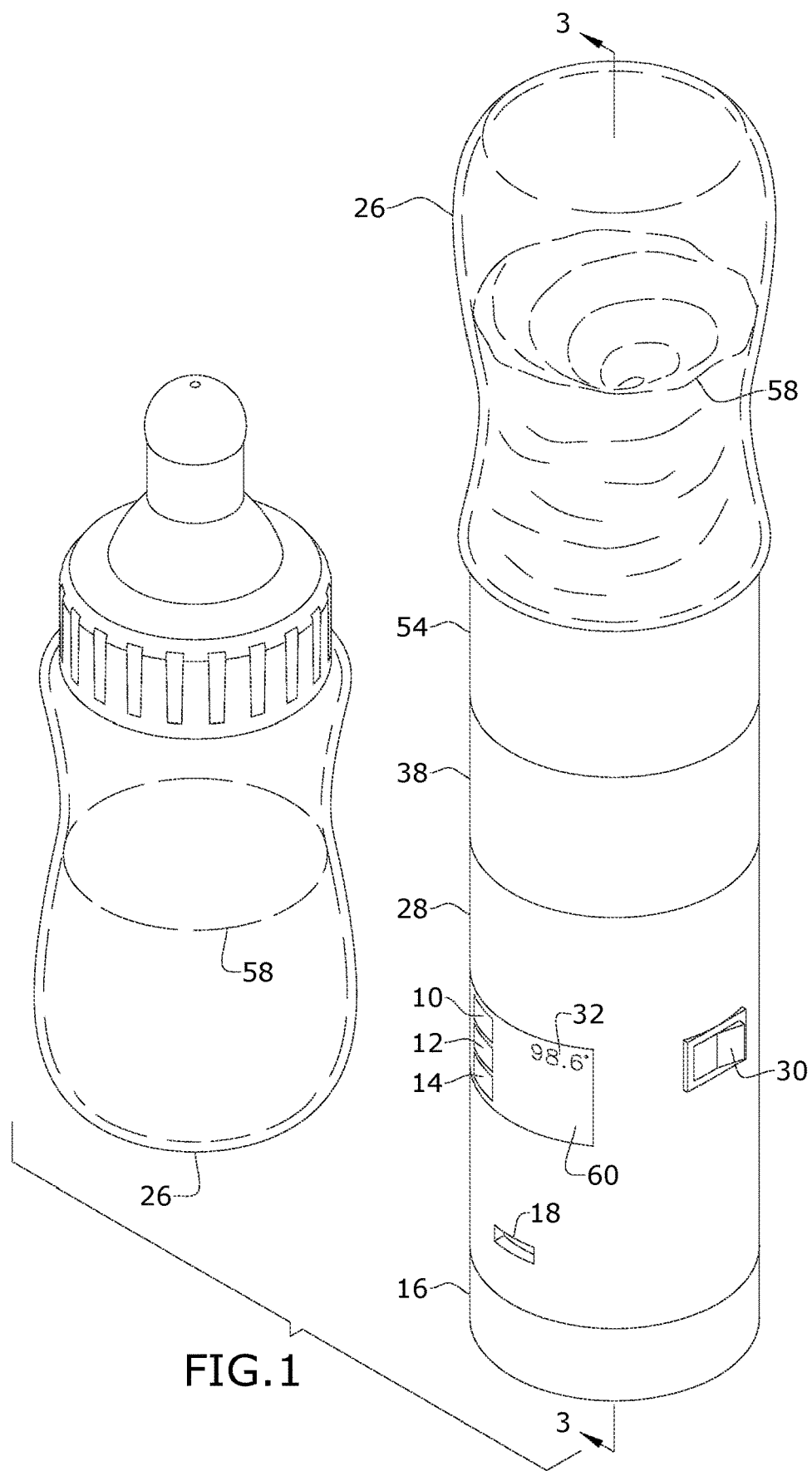
FIG. 1 is a perspective view of a warming and blending apparatus according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a portable, rechargeable, and temperature-controlled device for blending and warming baby formula or breast milk in baby bottles.

The inventive blender includes all bottle-making components and rapid, timed, temperature-controlled warming and thorough blending capabilities in one device for at home or on-the-go use anywhere, anytime, including in the car and stroller. The device is reliable, convenient, efficient, portable, and lightweight, with a storage component to keep formula ready for use. This rechargeable and portable blender enables a user to rapidly warm, to rapidly blend, or to rapidly warm and blend simultaneously. The bottle is properly blended with temperature control, resulting in minimal bubbles, and without chunks that may lead to health problems for baby.

The blender may have a base assembly that serves as a housing for blending and heating components. The base is preferably shaped and dimensioned to fit into cup-holders in cars, strollers, etc.

The blender may have a temperature control system comprising a computer, or controller, in the base that monitors a temperature sensor, alerting the user once the liquid is heated to a temperature selected by the user, such as 98.6 degrees Fahrenheit. The computer may also provide a timer to alert the user when the liquid is homogenized.

The device may have a detachable agitator, such as a blade or whisk, on an axle, said whisk being spinnable by the computer in the base for a predetermined period, e.g., until the liquid is homogenized or homogenized and warmed. The computer may be controlled by selecting a setting on a computer control panel using, e.g., blend or blend/warm buttons to indicate the user's operating mode selection. Upon receipt of the selected operating mode, the computer selectively activates one or both the heating element and the whisk. The whisk is effective to thoroughly mix baby formula without any bubbles.

A lid may removably close the device when a bottle is not present.

The device may be recharged with a universal serial bus (USB) cord coupled with a built in USB charging port. The charging port enables users to utilize the device in a portable manner and enables the device to work for several hours, depending on usage. The user may charge the device beforehand or may charge the device on location to ensure the device is always available for use. The computer may have an indicator to alert the user of the charging status (in progress/complete). Once charged, the lid of the mechanism may be opened.

In some embodiments, the blender may have an adapter to fit various bottle sizes, operative to couple the bottle to the base assembly.

In some embodiments, instead of setting the device on top of the bottle with the mixing element toward the bottom, and flipping the device over for operation, a portable whisk device with a heating element may be configured to be operated on top of the bottle.

In some embodiments, the device may further comprise a carrying strap.

In some embodiments, the device may have wireless connectivity with a network interface card and a computer application loaded, for example, on the user's smartphone, to enable users to track feedings and other information for baby, including alerting the user once the bottle is ready or reminding the user of feedings.

In some embodiments, the device may have a detachable storage compartment that twists onto the bottom of the base opposite the attachment point for the whisk. The user may put formula powder in the storage component, reducing the number of items to carry for making the bottle.

The materials of manufacture are not particularly limited provided that the device may be cleaned quickly and efficiently for repeated use. The inside of the base where the liquid mixes is preferably a metal or rubber material easily cleaned. The whisk is preferably a rubber material as well. The components are preferably bisphenol A (BPA)-free.

The device is not limited to use with baby formula and may be used to mix and/or warm any suitable liquid, powder, or solid substance. The inventive device may blend a liquid, warm a liquid, or blend and warm at the same time, eliminating additional cumbersome components of bottle preparation. To blend and warm a liquid, a user may fill a baby bottle with a predetermined water/formula ratio, e.g., using formula from the storage component; place the whisk on the axle; place the blender base on top of the bottle with the whisk inside the bottle, using an adapter in some cases; twist the device to tighten; and invert the entire assembly. The user may select the blend and warm setting; the device indicates when the blending and warming is complete. The user may then invert the assembly such that the bottle is right side up; unscrew the blender from the bottle and wipe the device clean. To warm a liquid, the steps above may be followed without attaching the whisk and selecting the warming setting. To blend a liquid, the steps above may be followed including attaching the whisk and the user may select the blending setting.

Referring to FIGS. 1 through 5, FIG. 1 illustrates a portable warming blender according to an embodiment of the present invention in use, including a detachable formula storage container 16 coupled with a base housing 28 on a first end, a motor housing 38 coupled with the base housing 28 on a second end. A cylindrical mixer housing 54, which may be made of plastic, is coupled with the motor housing 38 opposite the base housing 28. The mixer housing surrounds a recessed portion in the device. The storage container 16 is distal to the recessed portion. A baby bottle 26 containing mixed formula 58 is shown with its mouth threadedly attached to the mixer housing 54, an inner surface of which is threaded. A second baby bottle 26 is shown beside the device. The base housing 28 includes an on/off power switch 30 operative to power on the device, a USB charging port 18, and a display screen 60 displaying a temperature 32 sensed, with a warm button 10, a blending button 12, and a warm and blend button 14 to one side.

Figure 2:
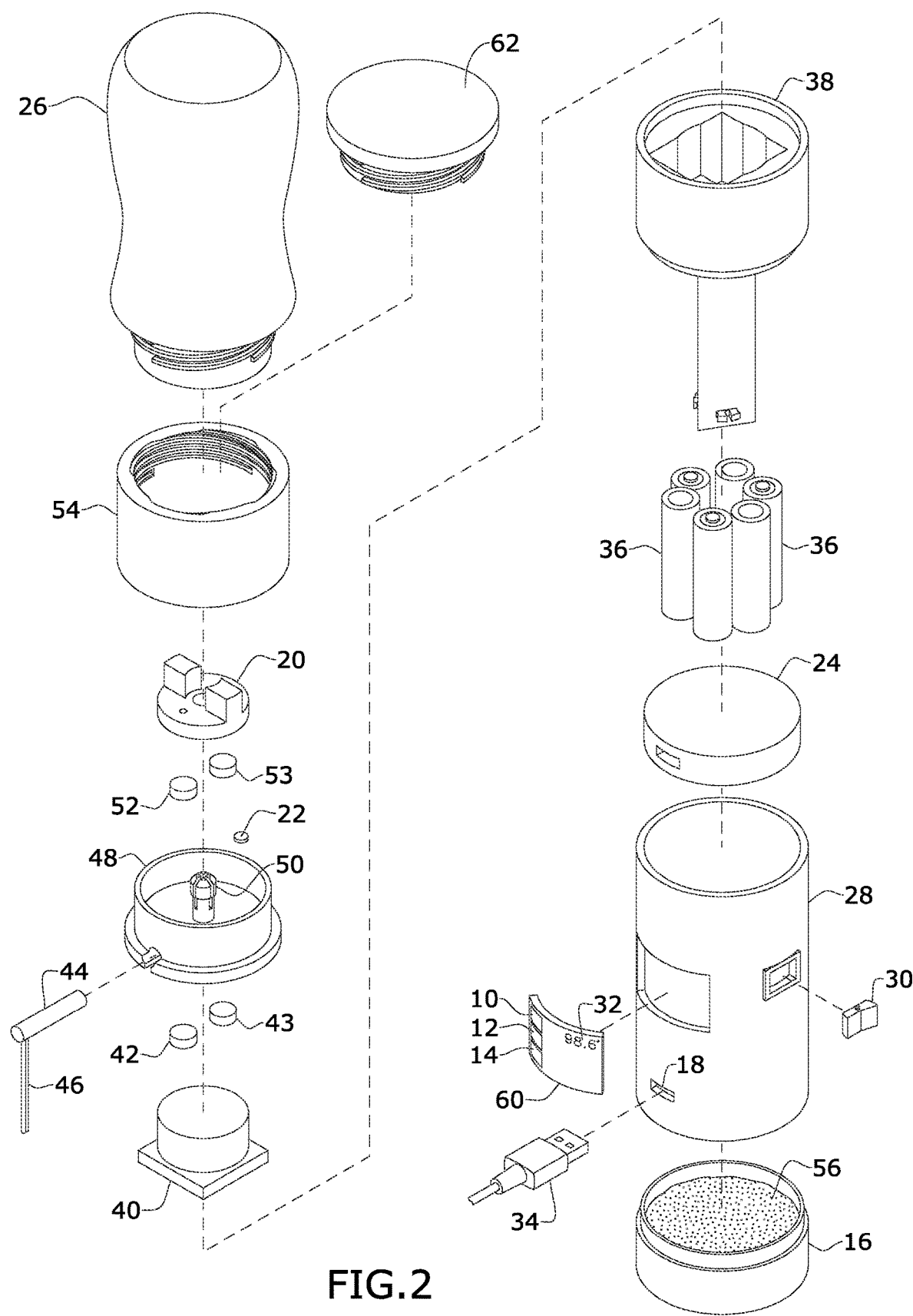
FIG. 2 is an exploded view thereof.

As shown in FIG. 2, within the mixer housing 54 is an inner mixer housing 48, which may be made of metal, with a whisk post 50 extending longitudinally therefrom, a removable whisk 20 rotatably mounted on the whisk post 50, and a temperature sensor 22 adjacent to the whisk 20. The display screen 60 electrically communicates with the temperature sensor 22. With a bottle 26 attached to the device, the whisk post 50 and the removable whisk 20 extend into the bottle by a predetermined distance. When the bottle 26 is absent, a lid 62 may be screwed on to protect interior of the mixer housing 54. The removable whisk 20 has a disc-shaped base with two substantially rectangular protrusions on each side of a central aperture. Whisk magnets 52, 53 within the whisk 20 base are magnetically coupled with motor magnets 42, 43 atop an electric motor 40. The motor housing 38 has a cylindrical outer sidewall, a square recessed region to accommodate the motor 40, and a central protrusion narrower than the outer sidewall with electrical contacts at one end. The motor housing 38 protrudes into the base housing 28 and is encircled with rechargeable batteries 36, i.e., a rechargeable power system, which rest upon a disc-shaped computer control board 24. Dry formula 56 is shown stored within the detachable formula storage container 16.

Figure 3:
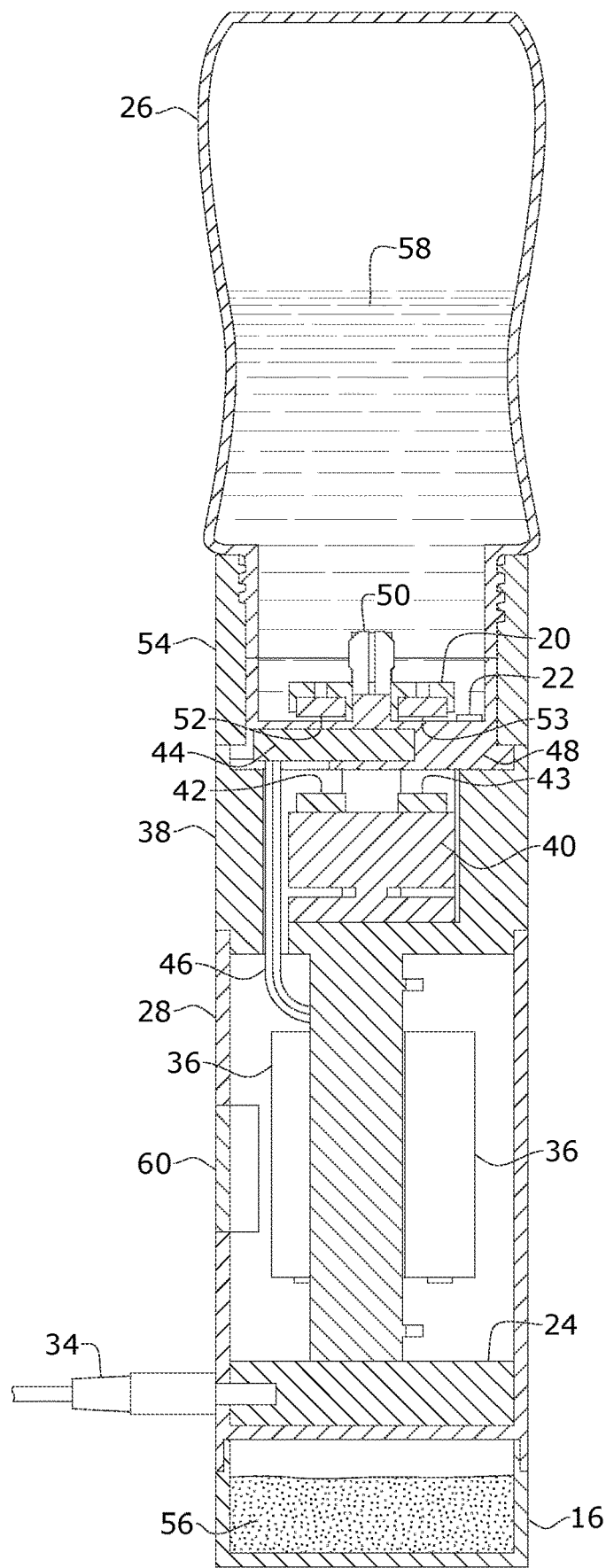
FIG. 3 is a sectional view thereof, taken along line 3-3 on FIG. 1.

A cord with a USB plug 34 may be inserted into the USB charging port 18 to charge the batteries 36, as shown in FIG. 3. Wires 46 transmit electricity from the batteries 36 to a heating element 44 which is in thermal communication with the recessed portion to warm liquid within the bottle.

Figure 4:
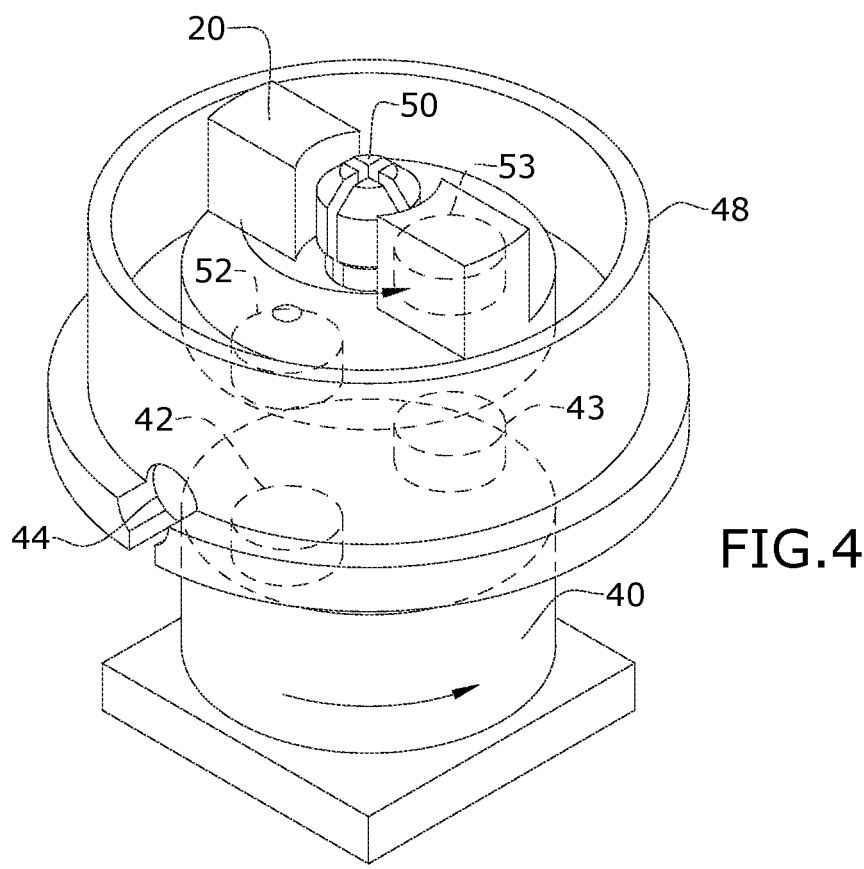
FIG. 4 is a detail view thereof.
Figure 5:
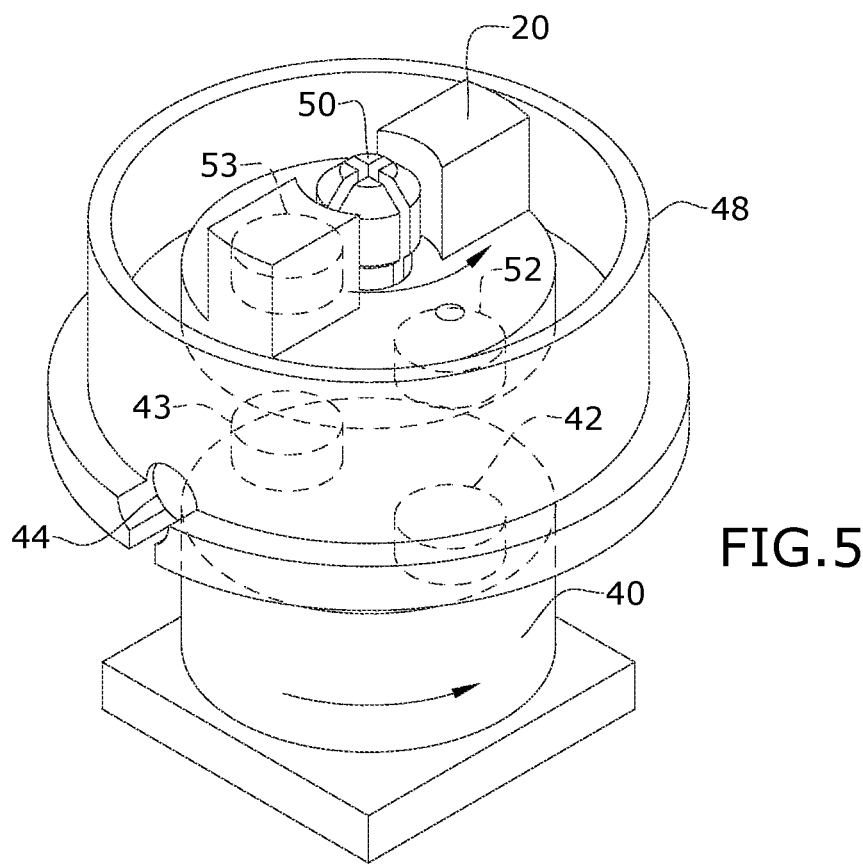
FIG. 5 is another detail view thereof.

FIGS. 4 and 5 illustrate operation of the motor 40, which turns the motor magnets 42, 43, causing the whisk magnets 52, 53 to spin the whisk 20 around the post 50.

It should be understood, of course, that the foregoing relates to exemplary embodiments of the invention and that modifications may be made without departing from the spirit and scope of the invention as set forth in the following claims.

What is claimed is:

1. A portable warming blender, comprising:
 a base assembly including a housing with a cylindrical sidewall and a recessed portion, wherein an inner surface of the recessed portion is threaded and configured for receipt of a baby bottle;
 a whisk post extending longitudinally into the recessed portion, the whisk post extending to form four evenly spaced, parallel, rounded protrusions at one end, disposed at 90° intervals;
 a temperature control system including a temperature sensor and a heating element, the temperature sensor being mounted adjacent to the whisk post, the heating element being in thermal communication with the recessed portion of the housing;
 a detachable blending foil consisting essentially of a first substantially rectangular prismatic member and a second substantially rectangular prismatic member rotatably and detachably mounted on the whisk post, wherein the detachable blending foil is configured to homogenize liquid and a particular substance into a uniform suspension while minimizing air bubble formation and stratification, wherein each of the first substantially rectangular prismatic member and the second substantially rectangular prismatic member includes an opposing curved surface, and wherein the four evenly spaced, parallel, rounded protrusions of the whisk post are configured to enable the detachable blending foil to mechanically engage in a releasable interference fit with a complementary structure of the detachable blending foil;

an electric motor mounted within the housing, the electric motor being magnetically coupled with the detachable blending foil, wherein the electric motor is coaxially aligned with the whisk post and magnetically drives the blending foil through an axial magnetic coupling housed within the base assembly;

a rechargeable power system mounted within the housing, comprising a rechargeable battery electrically communicating with a charging port within the cylindrical sidewall; and a controller operative to selectively transmit power to the temperature control system and the electric motor from the rechargeable power system upon receipt of an operating mode selection.

2. The portable warming blender of claim 1, further comprising a detachable storage compartment threadedly coupled with the housing distal to the recessed portion.

3. The portable warming blender of claim 1, further comprising an adapter operative to couple the recessed portion of the base assembly with a mouth of the baby bottle.

4. The portable warming blender of claim 1, wherein the base assembly is to fit into a cup holder configured to facilitate use during travel and prevent device tipping.

5. The portable warming blender of claim 1, further comprising a strap attached to the base assembly.

6. The portable warming blender of claim 1, wherein the controller further comprises a network interface card.

7. The portable warming blender of claim 1, wherein the cylindrical sidewall further comprises a display electrically communicating with the temperature sensor and operative to display a temperature sensed by the temperature sensor.

8. The portable warming blender of claim 1, further comprising at least one switch operative to power on the portable warming blender and operative to transmit a selected operating mode to the controller.

9. The portable warming blender of claim 1, further comprising a lid removably attached to the recessed portion of the housing.

10. The portable warming blender of claim 1, wherein the inner surface of the recessed portion is configured to threadedly attach to the baby bottle such that the whisk post and the detachable blending foil extend a predetermined distance into the baby bottle.

11. The portable warming blender of claim 1, wherein the detachable blending foil consists of a pair of circularly shaped magnets.

12. The portable warming blender of claim 1, wherein the electric motor turns a pair of circularly shaped magnets configured for magnetically coupling with the detachable blending foil.

* * * * *